March 31. 1925.
J. W. SHEPARD
1,532,085
LOCOMOTIVE VALVE GEAR MECHANISM
Filed June 22, 1922     4 Sheets-Sheet 3
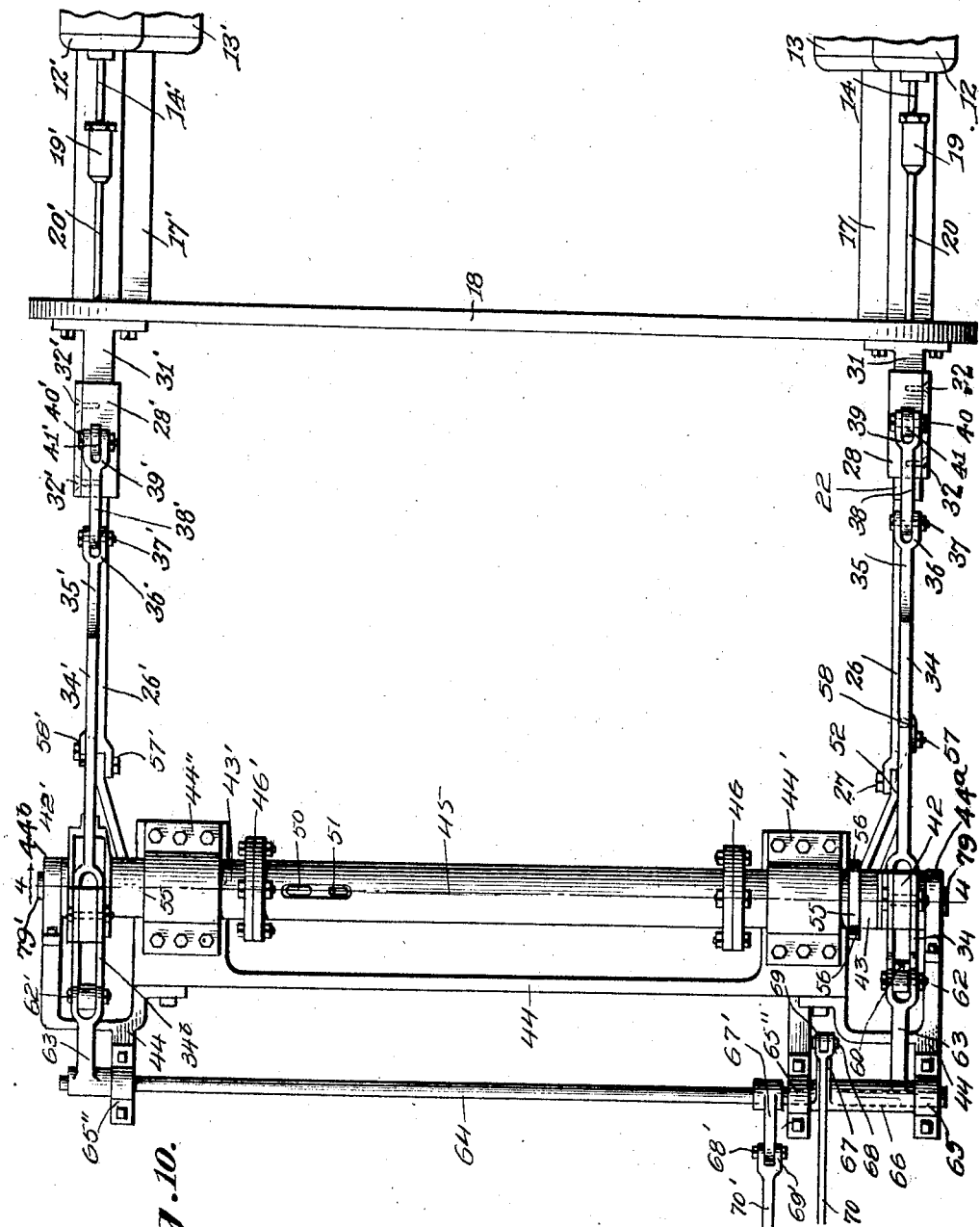

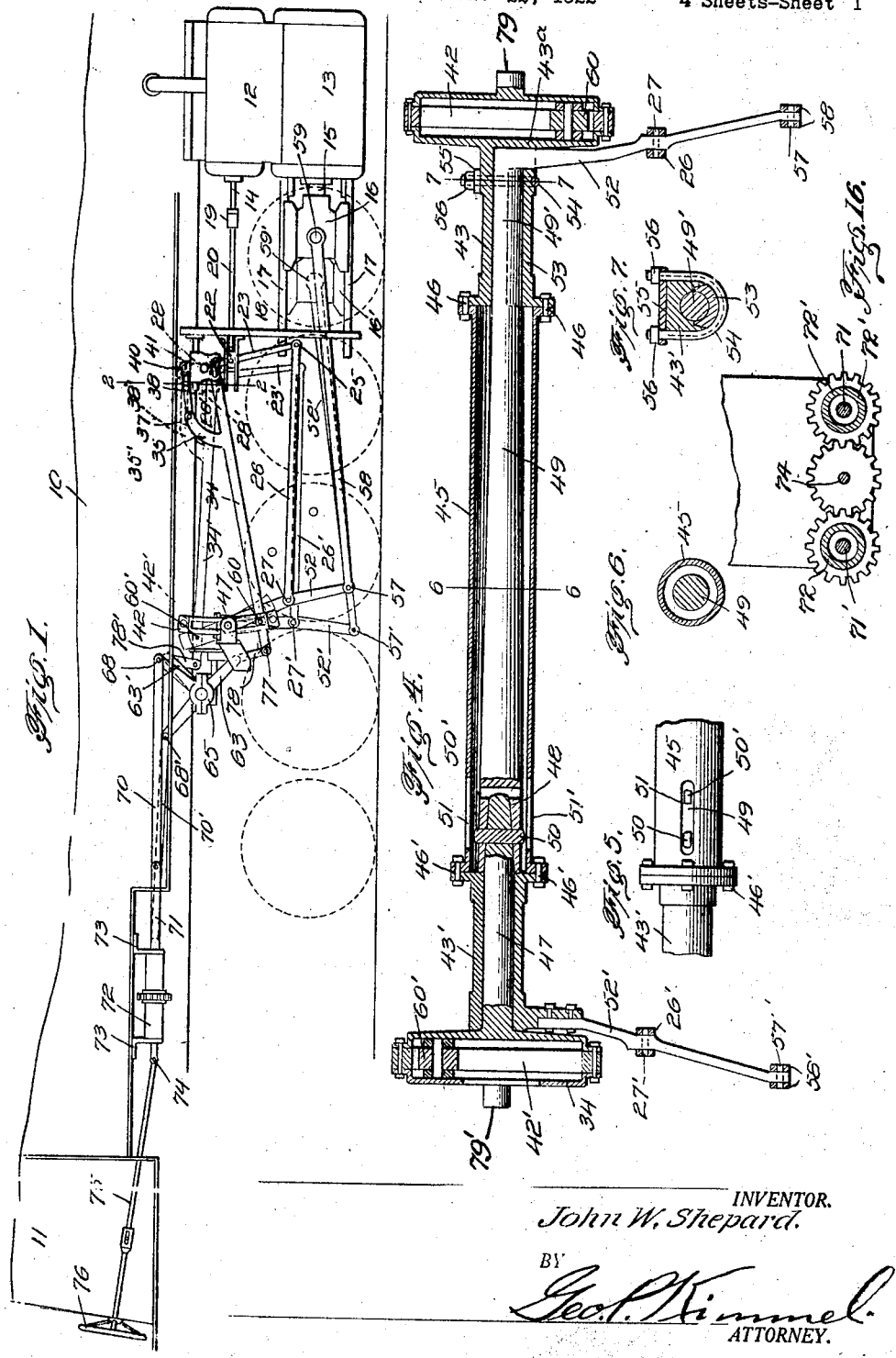

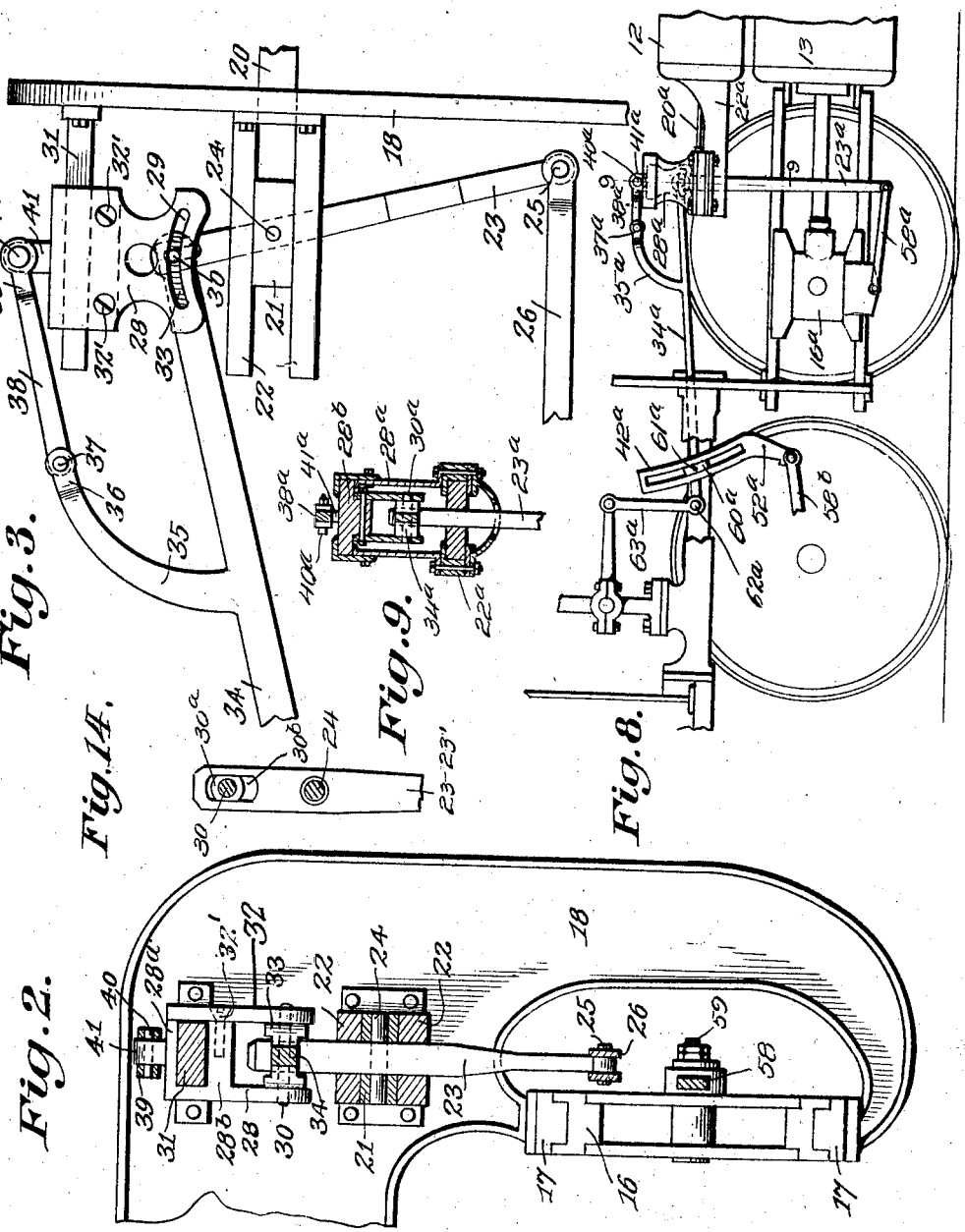

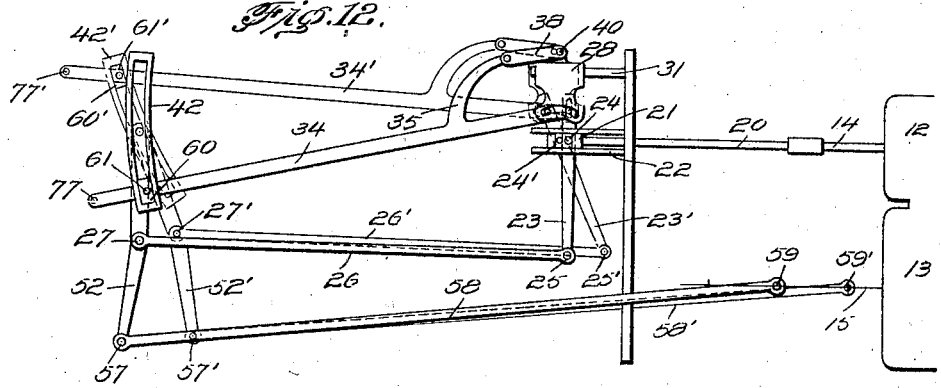
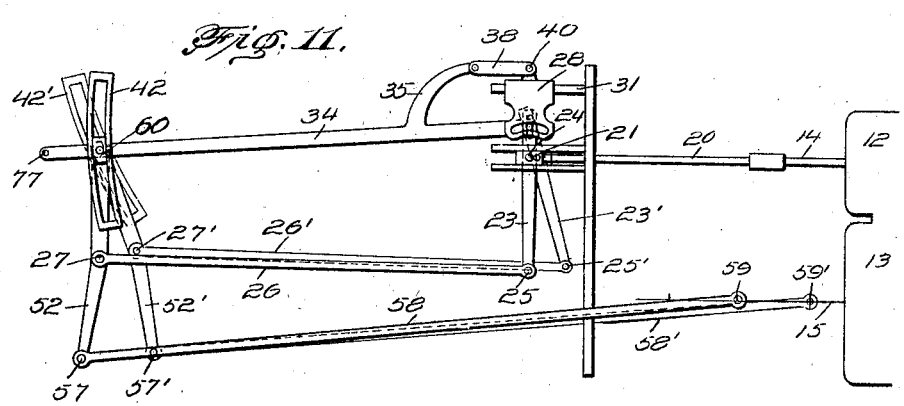
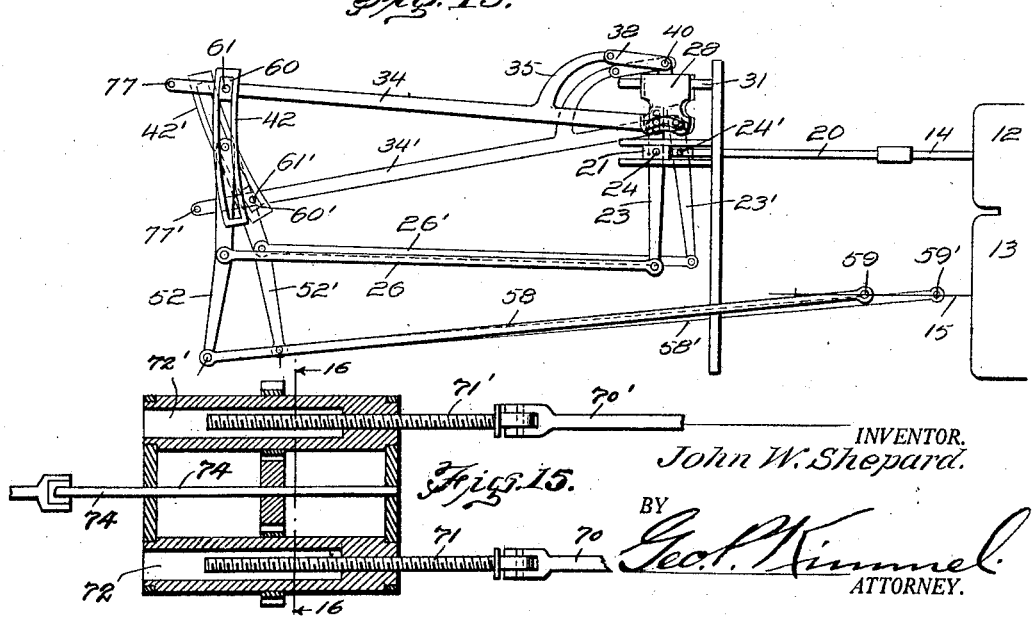

Patented Mar. 31, 1925.

1,532,085

UNITED STATES PATENT OFFICE.

JOHN W. SHEPARD, OF TUCSON, ARIZONA.

LOCOMOTIVE VALVE-GEAR MECHANISM.

Application filed June 22, 1922. Serial No. 570,133.

*To all whom it may concern:*

Be it known that I, JOHN W. SHEPARD, a citizen of the United States, residing at Tucson, in the county of Pima and State of Arizona, have invented certain new and useful Improvements in Locomotive Valve-Gear Mechanisms, of which the following is a specification.

This invention appertains to certain improvements in valve gears for locomotives, and has for its principal object to provide for an extremely simplified and mechanically refined construction and arrangement of parts, whereby to function accurately and efficiently for adjusting or varying the initial opening or lead of the valves and correspondingly at the opposite sides of a locomotive.

Another object of the invention is to provide for a mechanism of the character mentioned, and one of an improved construction, arrangement and mounting of the parts thereof, whereby to be practically free from the usual severe and inherent vibrations, jolts and jars, incident to the travel of a locomotive, so that the desired accuracy and efficiency of the mechanism is maintained throughout a longer period of usage than now obtained in known types of these mechanisms.

A further object of the invention is to provide for a mechanism of the class set forth, and one capable of being mounted directly on the frame of a locomotive, whereby to be sustained by the springs interposed between the frame and the truck axles, so that the vibrations, jolts and jars incident to the travel of the latter over the rails of a trackway, are absorbed by said springs and are not transmitted directly to the mechanism, as commonly occurs in known methods of mounting of the same.

A still further object of the invention is to provide for a valve gear for locomotives, which is free from all connections with the drive wheels, cranks or pins and journals thereof, whereby the desired accuracy and efficiency of the gear is increased to and maintained at maximum throughout the continued and long usage of the same, and to a degree not heretofore possible in the types of valve gears now in use.

Among numerous other and equally important objects, the invention also provides for a valve gear embodying much needed refinements in valve motion whereby all events in such motion during each cycle of action of the same is greatly improved; the differential lead of the locomotive valves is applied automatically, the combination levers are moved to more desirable positions, a better balance is obtained on the main wheels of a locomotive; the life of the road bed is greatly increased or otherwise preserved by a marked lessening of the quarter pound of the drive wheels of the locomotive on the rails; all strain is relieved from the crank of the locomotive; and the construction and arrangements of the valve gear is generally improved from the view point of increased economy and efficiency in installation, operation and maintenance.

With the foregoing and other objects in view, the invention resides in the certain new and useful construction, arrangement and operation of parts, as will be hereinafter more fully described, set forth in the appended claims, and illustrated in the accompanying drawings, in which:—

Figure 1 is a fragmentary diagrammatical side elevation of a conventional form of locomotive, and showing a preferred embodiment of the improved valve gear as applied thereto, Figure 2 is a fragmentary vertical section taken on the line 2—2 of Figure 1, Figure 3 is an enlarged fragmentary detail of the variable lead mechanism and showing the manner of mounting the same in position, Figure 4 is a longitudinal section through the assembly of a built-up link shaft, the same being taken on the line 4—4 of Figure 10, Figure 5 is a fragmentary detail of one of the connected ends of the outer hollow shaft portions of the built-up link shaft, Figure 6 is a transverse section taken on the line 6—6 of Figure 4, Figure 7 is a transverse section taken on the line 7—7 of Figure 4, Figure 8 is a detail assembly of a form of variable lead attachment of the present form of the invention as it appears, when applied to the "Walschaert" valve motion, Figure 9 is a fragmentary vertical section taken on the line 9—9 of Figure 8, Figure 10 is a fragmentary plan view of the preferred assembly of the concentric links and reversing shafts and the co-related parts of the improved variable lead valve motions, Figure 11 is a diagrammatical view, in elevation, of one unit of the improved valve gear, and showing the motions defined by the moving parts thereof, when the gear is set at neutral position, Figure 12 is a similar view thereof, with the mechanism set for forward motion, Figure 13 is another similar view of the same, when the mechanism is set at reversed position, Figure 14 is a fragmentary detail, partly in section, and showing the upper slotted end portion of one of the combination levers and its connection with a radius rod at one side of a locomotive.

Figure 15 is a detail sectional view of the control or shifting mechanism for the valve gear mechanism.

Figure 16 is a transverse sectional view taken on line 16—16 of Figure 15.

Referring to the drawings, wherein similar characters of reference designate corresponding parts throughout the several views thereof, the numerals 10 and 11 indicate portions of the boiler and cab of a conventional type of locomotive 12, 12', and 13, 13', the exterior representations of the steam chests and cylinders of the latter, the steam chests containing valves, and cylinders and 13, 13', the pistons, (the valves and pistons not being shown). The oscillation and reciprocation of the pistons within the cylinders 13, 13', functions to propel the locomotive while the valves located within the steam chests 12, 12' functions the distribution of steam, and are located between the boiler 10 and the cylinders 13, 13'. The oscillations or reciprocations of the pistons, under the pressure of steam, are transmitted by horiontally extending piston rods 15 connected to cross heads 16, 16' which are in turn confined to horizontal movements by guides 17, 17' secured to guide yokes 18, 18', and the power developed by the pistons is transferred from intermediate connections in the cross heads 16, 16', and distributed by connecting rods through the several driving wheels (indicated in circular dotted lines) to the intermediate portion of the locomotive as a whole. The numerous applications of the driving wheels to the locomotive being necessary to avoid the slippage of the wheels and to provide a greater traction force, and, the arrangement as shown, is common to known locomotive constructions.

Referring further to the valves within the steam chests 12, 12' which function the distribution of steam passing from the boiler 10 to the cylinders 13, 13', the same, in each cycle of their action, operate correspondingly to produce the necessary four periods of admission, cut-off, expansion and exhaust of the steam to, within and from the cylinders 13, 13'. This improved construction and arrangement of parts, as illustrated and described in the present case, functions a more refined distribution whereby to utilize the four periods of the cycle in the action of the steam to effect a greater efficiency and economy in locomotive operation. The valve stems 14, 14', are connected to each of the valves within the steam chest 12, 12', and are in turn connected as at 19, 19', to the valve rods 20, 20', which have their opposite ends connected to cross heads 21, 21', as at 24, 24', the cross heads 21, 21', being supported in guides 22, 22', whereby the valve stems 14, 14', and 20, 20', together with the cross heads 21, 21', are confined to horizontal movements, while a pair of combination levers 23, 23', are pivotally engaged, at intermediate points thereon, on pivot pins 24, 24', carried in the cross heads 21, 21', respectively. The lower ends of the combination levers 23, 23', are pivotally connected as at 25, 25', to one end of each of a pair of combination links 26, 26' which have their opposite ends pivotally connected at intermediate points on a pair of rocker arms 52, 52', as at 27, 27'. The foregoing parts and connections being the origin and extent of the motion of the valve gear effecting the primary movements of the valves within the steam chest 12, 12'.

The valve gear mechanism includes a pair of transmission bars each formed with a primary portion and a secondary portion. The primary portions of said bars are indicated at 34, 34', and each has its forward end bifurcated, as at 33. The bifurcated ends 33 of the primary portions of the transmission bars are fastened on pivots 30, 30', which extend through the bifurcated ends 33, and further connect the combination levers 23, 23' with the primary portions 34, 34', and also to slotted shiftable shoe elements to be hereinafter referred to. These transmission bars 34, 34' and the connections thereof, which will be hereinafter more particularly referred to and in greater detail, have a fixed longitudinal movement until disturbed by the movement of the reversing mechanism of the locomotive, while the opposite ends of the same, in turn, are pivotally supported as at 77, 77', and in proximity to the ends 77, 77', pivotally connected, as at 61, 61' to controlling blocks 60, 60' to vary their positions in the radius of the links 42, 42', one reversed to the other. The pivots 77, 77', connect the transmission bars, to the lower ends of hangers 78, 78', pivotally connected, at their upper ends, as at 62, 62', to arms 63, 63'. The arms 63, 63' are operable from a sleeve 66 and a shaft 64 and upon the latter the sleeve 66 is mounted. The shaft 64 is supported at its opposite ends in bearings or hangers 65, 65' and 65''. This tumbling shaft 64 and the sleeve 66 are separable, the latter being slipped onto one end of the former and provided with the arms 63, 63', respectively, which are independent in movement and disposed oppositely in relation, one with respect to the other. The operation of the shaft 64 and the sleeve 66, together with the arms 63, 63', being controlled by means of a pair of arms 67, 67', which are also oppositely disposed for movement with respect to each other, and in right angular relation each with its complemental arm 63, 63'. This shaft 64, as a whole, is supported in bearings or hangers 65, 65' and 65'', as hereinbefore stated, and which, in turn, have their support on a bracket 44, extending transversely of the locomotive and beneath the boiler 10 thereof, substantially as shown. The sleeve 66 and its co-related arm 63, work in directions opposite to the shaft 64 and the arms 63', 67', thereon, as for instance, when arm 63 is operated in a downward direction carrying the slide block 60 to the lower end of the link 42, the arm 63' is moved in an upward direction and carries slide blocks 60' to the upper end of the link 42', and vice versa. This arrangement and movement of parts being necessary and due to the positions of the cross heads 16, 16' from which the movement is derived through the pivot connections 59, 59', therewith, and through their pivot connections 57, 57' to the lower ends of the rocker arms 52, 52', since the cranked positions on the drivers of the locomotive are 90 degrees and 270 degrees apart on the circle defined by the movements of the said cranks and this reversed order of working of the transmission bars, and the parts connected thereto, is necessary to function the desired distribution of steam within the cylinders 13, 13', at the proper time. The motion resulting from this arrangement of parts, is obtained from the cross head connections 59, 59' and is transferred therefrom to the pivot connection 57, 57' to the lower ends of the rocker arms 52, 52', through the medium of the connecting rods 58, 58', and is the only attachment, part or connection necessary to provide both primary and secondary movements, the primary motion being derived through the pivot connections 27, 27', of the rocker arms 52, 52'.

In the method of distribution, as contemplated in the foregoing construction and arrangement of parts, it is necessary that a substantial means be provided for transferring motion from one side of the locomotive to the other and across the truck frames to the latter and wherein secondary motion of the connection 59, on the right cross head 16 will be transferred through the connecting rod 58, pivot connection 57, rocker arm 52, to the left link 42', while that of pivot connection 59' on the left cross head 16' is transferred through connecting rod 58', its pivot connection 57' with rocker arm 52' to the right link 42; primary motion as has been hereinbefore stated, being derived at the pivotal points 27, 27', of the links 26, 26', with the rocker arms 52, 52'.

Referring now to Figure 4, there is shown a concentric link shaft assembly for the accomplishment of the foregoing stated transfer of motion, and it will be noted by reference thereto, that the intermediate portion of the outer shaft 45 is not attached in any way to the inner shaft, and the bearing portion for the latter is provided by the interior of the outer shaft within the portions thereof 43, 43'. The inner shaft is preferably made of two sections 47, 49, which are separable as at 50, the connection therebetween being made by usual draw key 50, insertible through slots 51, provided for the assembling of the same, while the intermediate connections of the outer shaft portion are shown at 46, 46'. The outer shaft 45 includes an intermediate section and a pair of outer sections. The outer sections are indicated at 43, 43' and the said outer section 43' is provided with an opening in its lower part for the passage of the rocker arm 52 which depends from the portion 49' of the section 49 of the inner shaft. The section 43' of the outer shaft has a depending extension to which is fixedly secured the rocker arm 52'. The setting up of the inner as well as the outer shaft of a plurality of sections facilitates the assembling of one shaft with respect to the other. The section 43, of the outer shaft is provided with a removable bottom portion 53, having its outwardly disposed end supported in position by a yoke 54, which has a solid cross bar 55 connecting the free ends thereof at the upper side of the section 43, and the bar 55 is secured in position by means of nuts 56 threaded on the free ends of the yoke to facilitate a solid maintenance.

The right link 42, containing slidable block 60, is bolted to the outer portion of the section 43 of the outer shaft, substantially as shown in Figure 4, while the left link 42', containing slidable block 60', is secured in the same manner to the outer end of the solid shaft portion 47 of the interior shaft. The opposite ends of the completed shaft and link assembly provided with trunnions 79, 79', for the journaling of the same in bearing portions $44^a$, $44^b$ of the bracket 44. This arrangement as a whole, provides a means of locating the valve gear on the frame of an engine, thus avoiding the rigid and non-elastic features occasioned by direct connections to driving wheels, and also provides for superior primary and secondary movements. In this particular mechanism, as well as in other known forms of valve motion, the primary movement is equal to the lap of the valves, within the steam chest 12, 12′, plus the lead, and the changes effected in the present valve gear as hereinbefore described for the same, so far only concerns the origin of this primary movement and of the actual needs for its application, its maximum and co-related minimum applications to be described hereafter.

It is here deemed necessary for a betterment in explanation of the advantages of the present invention, to reiterate the fact that the link motion is reversed in its position from the opposite sides of the locomotive, and not only does the right cross head 16 deliver motion to the left link 42′, and the left cross head 16′ deliver its motion to the right link 42, but the concentric positions of the sliding blocks 60, 60′, also work in correspondingly opposite positions. The increased size and length of locomotives generally, has rendered certain of the once successful types of valve gears useless for the intended purposes thereof, and the lateral movement of the front and rear wheels of modern constructions, as in the articulated type of locomotives, is 8″ to 14″, and with this arrangement, differential movement, front or back laterally, is non-effective, since all parts of the gear are attached to the locomotive frame, and consequently the usual return crank is eliminated. It should be noted that the return of the combination levers 23, 23′, is delayed, having a shorter swing of lower connection, as the corresponding position is similar to that of a slowly returning piston, which, by the shortening of the lower connection and having the same distance to recede, is at the rate of 50% to 100%. Greater, or maximum movement delivered from central position of opposite cycle of action, overwhelmingly laps the motion delivered by the slowly returning combination levers 23, 23′, which fact develops an abundant early admission of steam and makes possible an increase of steam lap of valves, and maintains an exhaust, the exhaust occurring, with respect to the period, corresponding with that of admission.

Having set forth in the preceding descriptive matter, functions co-related et cetera, as arranged to provide an adequate primary and secondary movement of valves within the steam chests 12, 12′, the same being oppositely disposed on the right and left hand sides of the locomotive, respectively, the following description will set forth the effects obtained, together with the mechanical means as herein after claimed: Variation of the initial opening of the valves, called lead, is derived directly from the secondary portions of the transmission bars.

The secondary portions of the transmission bars consists of the curved arms 35, 35′ having bifurcated upper ends 36, 36′ pivoted together as at 37, 37′ to links 38, 38′, formed with bifurcated ends 39, 39′ pivotally connected, as at 40, 40′, to vertically extending upper arms 41, 41′ formed integral with the top of the shiftable shoes 28, 28′, which are mounted for sliding movement on horizontally disposed guides 31, 31′ securely bolted to the guide yoke 18. Each of the shoes 28, 28′ comprises a plate formed with a pair of right angularly disposed flanges 28ª, 28ᵇ, and secured to said flanges, through the medium of the holdfast devices 32′ is a plate 32. The flanges 28ª, 28ᵇ, in connection with the plate 32, forms a guide passage through which extends a guide 31 or 31′. Each of the supports at each side, at the lower end, is formed with a segment shaped slot 29 and into the slots of each shoe extends a pivot 30 or 30′. The bifurcated forward end of the primary portion of a transmission bar extends into a shoe and is connected therewith by a pivot 30 or 30′.

The secondary portions of the transmission bars are arranged in superposed relation with respect to the forward ends of the primary portions of said transmission bars and the curved arms 35, 35′ of the secondary portions of the transmission bars are formed integral with the top edge of the primary portions of the transmission bars and curve in a forward direction.

By setting up the secondary portions of the transmission bars, in the manner as stated, motion from the radial swing of the secondary portions is transferred therefrom and makes its delivery to the arms 41, 41′ to the shoes which are slidably mounted on the guides 31. The lower cross heads 21, 21′, being confined to horizontal motion by the guides 22, 22′ and supporting combination levers 23, 23′ as at 24, on the same pivot and connection following a continuous oscillating motion when the locomotive is in operation, while its upper connection as at 30, is provided with a slidable block 30ª located within the walls of a slot way 30ᵇ, whereby to provide for a vertical movement of the upper connection of the combination levers 23, 23′. It will thus be seen that the variable lead is derived from transmission bars, oppositely disposed to the sides of the engine or the other parts of the mechanism. With the transmission bars in fixed position, the variable lead of the valves is also fixed, affording minimum movement when the slotted yoke has passed over the horizontally fixed position of 30, which is rigidly fixed to the transmission bar 34, 34′, its function being to slide block 30ª at the top of the combination levers 23, 23′ downwardly, reducing the space between the block 30ª and the pivot 24 to a minimum when the sliding blocks 60, 60′, are at extreme positions, as at the bottom or top of the links 42, 42', such positions being desirable in starting the locomotive, the maximum leads being automatically restored in the same manner as engine gains in momentum and reverse mechanism is returned toward center as in running a locomotive with the valves in cut-off position. Thus, the mechanism affords an automatic variation in the primary opening, called lead: effecting its minimum in starting, as is desirable; and restoring its maximum when momentum is gained in the running of the locomotive when the valves thereof are in cut-off position, as is desirable.

It will be observed from consideration of this variable lead attachment that I transfer a portion of radius bar motion, confine it to a horizontal motion by guide 31 centrally over the top of combination lever 23 and the front end of a transmission bar, both held fast to horizontal position, its downward or vertical motion being effected by a portion of slot 29, which is followed by pivot 30 which is in turn forced down in vertical slot 30$^b$.

The reversal, as described as being effected by intermediate gear, having motion oppositely disposed, balances and eliminates the necessity of carrying counter-balance springs, reducing labor of reversing to a minimum. The slight vibration is absorbed in cylinders arranged outside the cab of the locomotive.

In the operation of the mechanism as described herein, the motion delivered to the valves is composed of two separate movements, the first movement consisting of a distance sufficient to equal the lap plus the lead, the lap being that portion of the valve which laps the steam admission edges of the steam ports when the valve is placed centrally over the ports. Lead is that amount which steam port is opened to cylinder at the beginning of a stroke, and to make any variations in the lead it must be accomplished at that time. In the present instance, the initial movement of the right valve is received from the swing of rocker arm 52, connected as at 27. When the rocker arm 52 is advanced, as before stated, it is in position to make primary opening on the immediate side, secondary opening on the opposite side.

In the assembly of the concentric shaft, the links 42, 42', at the right and left ends thereof, are disposed parallel, but when active their motion is oppositely disposed, 180° equal reverse, and are pivotally connected at their lower ends, by the pivots 57, 57', to the crosshead on opposite sides by links 58, 58'. The point of divergence of the primary movement is formed at the intermediate connections 27, 27' of the links 26, 26' with the rocker arms 52, 52'. The links 26, 26' and their forward ends are connected, as at 25, 25' to the combination levers 23, 23'.

The variable lead is derived through the swing of the bars 34, 34', through the radius of the links with the blocks 60, 60'. The lead decreases as the blocks move either upward or downward from the center of the links and increases as the blocks approach the center, and by this arrangement maximum primary motion is had on one side when minimum secondary motion is had on the other.

The control or shifting mechanism for the valve gear mechanism as contemplated herein, is identical to that as shown and described in my copending application as filed under date of April 1, 1921, and serially numbered 457,598, and, in this instance, the crank arms 67, 67', on the shaft 64 and the sleeve 66, are pivotally connected by pivot pins 68, 68' to the bifurcated ends 69, 69', of the reach rods 70, 70', leading to and connecting the threaded reversing screws 71, 71', which are operable in the geared cylinders 72, 72', journaled in the brackets 73, 73'. The cylinders 72, 72', are rotated in the desired directions, through the medium of an intermediate geared shaft 74, such intermediate gear rotates cylinders 72, 72' right and left effecting the desired reversal in the geared cylinders and is so imparted throughout the mechanism, which in turn is connected to an operating shaft 75, which in turn leads to and connects a hand wheel 76 located in the cab portion 11 of the locomotive.

Referring to Figs. 8 and 9, I have illustrated an adaptation of the variable lead valve gear mechanism as contemplated in the present invention, to the so called "Walschaert" valve motion, and as shown, the combination lever 23$^a$ has its lower end connected, by means of a union link 58$^a$, directly to the engine cross head 16$^a$, while the yoke 28$^a$ is bolted in position on the guideway 22$^a$ of the cross head secured at the outer end of the valve piston rod 20$^a$. In this fixed yoke 28$^a$, I have mounted a slidable yoke structure 28$^b$, between the depending walls of which is disposed the upper end of a combination lever 23$^a$, with its pivot pin 30$^a$ pivotally connected to the bifurcated end of the primary portion 34$^a$ of a transmission bar, arranged with its opposite ends arcuate slotways formed in the said wall portions of the yoke structure 28$^a$. In this instance, the primary portion 34$^a$ of a transmission bar is formed with the arcuate arm 35$^a$, which has pivoted, as at 37$^a$ and at its outer end, a link 38$^a$, which, in turn, pivotally connects as at 40$^a$, to a lug 41$^a$ projecting centrally at the upper side of the yoke structure 28$^a$. Inwardly of the opposite end of the primary portion 34$^a$, the same is pivoted as at 61$^a$ to a slide block 60ª, slidably connected in the arcuate slotway of a link 42ª, and at its free end is also pivoted as at 62ª to a manually controlled setting arm 63ª. The setting of this type of mechanism, which is also duplicated at the opposite side of the locomotive, may be affected through the similar setting mechanism as is involved in combination with the other form of the improved valve gear mechanism.

It is to be understood that, while a preferred embodiment of the valve gear mechanism has been described and illustrated herein in specific terms and details of construction, arrangement and operation, various changes in and modifications of the same may be resorted to without departing from the spirit of the invention, or the scope of the claims appended hereto.

Having thus fully described the invention, what is claimed, is:—

1. A locomotive valve gear comprising a transmission bar consisting of a primary and a secondary portion, the latter arranged in superposed relation with respect to the former, a reciprocatory cross head adapted to be connected with the valve stem, a combination lever pivotally connected intermediate its ends to the crosshead for actuating the latter, a slotted horizontally shiftable shoe arranged above said cross head and having the upper end of said lever projecting therein, means extending into the slotted portion of the shoe for pivotally connecting said primary portion and lever together and for slidably connecting them to said shoe, means for pivotally connecting said secondary portion to the top of said shoe, and means for actuating said transmission bar and lever.

2. A locomotive valve gear comprising a transmission bar consisting of a primary and secondary portion, the latter arranged in superposed relation with respect to the former, a reciprocatory cross head adapted to be connected with the stem of the steam chest valve, a combination lever pivotally connected intermediate its ends to and actuating the cross head, a slotted horizontally shiftable shoe arranged above said cross head and having the upper end of said lever extending therein, a block slidably mounted in the upper end of said lever, a pin carried by the block and extending through the forward end of said primary portion and into the slotted portion of the shoe whereby said bar, lever and shoe are connected together and whereby the lever and primary portions are slidably connected to the shoe, means for pivotally connecting said secondary portion to the top of the shoe, and means for actuating said transmission bar and lever.

3. A locomotive valve gear comprising a transmission bar consisting of a primary and a secondary portion, the latter arranged in superposed relation with respect to the former, a reciprocatory cross head adapted to be connected with the stem of the steam chest valve, a combination lever pivotally connected intermediate its ends to the cross head for actuating the latter, a slotted horizontally shiftable shoe arranged above said cross head and having the upper end of said lever projecting therein, means extending into the slotted portion of the shoe for pivotally connecting said primary portion and lever together and for slidably connecting them to said shoe, means for pivotally connecting said secondary portion to the top of said shoe, means for actuating said transmission bar and lever comprising a slotted link, a block shiftably mounted in said link and having said primary portion pivotally connected therewith, a shaft carrying said link, a rocker arm depending from the shaft for rocking the latter, actuating means for said arm, and a link connecting said arm to said lever for operating the latter to reciprocate the cross head.

4. A locomotive valve gear comprising a transmission bar consisting of a primary and secondary portion, the latter arranged in superposed relation with respect to the former, a reciprocatory cross head adapted to be connected with the stem of the steam chest valve, a combination lever pivotally connected intermediate its ends to and actuating the cross head, a slotted horizontally shiftable shoe arranged above said cross head and having the upper end of said lever extending therein, a block slidably mounted in the upper end of said lever, a pin carried by the block and extending through the forward end of said primary portion and into the slotted portion of the shoe whereby said bar, lever and shoe are connected together and whereby the lever and primary portions are slidably connected to the shoe, means for pivotally connecting said secondary portion to the top of the shoe, means for actuating said transmission bar and lever comprising a slotted link, a block shiftably mounted in said link and having said primary portion pivotally connected therewith, a shaft carrying said link, a rocker arm depending from the shaft for rocking the latter, actuating means for said arm, and a link connecting said arm to said lever for operating the latter to reciprocate the cross head.

5. A locomotive valve gear comprising a reciprocatory cross head adapted to be connected with the valve stem of the steam chest valve, a lever pivotally connected intermediate its ends to said cross head for operating it, a horizontally movable shoe arranged above said cross head and provided with an arcuate slot, a transmission bar, means for pivotally and slidably connecting the upper end of said lever to said bar, said means shiftable in said slot, said slot being arranged at the lower portion of said shoe, means for pivotally connecting the top of said shoe with said bar, and means for actuating said transmission bar and lever.

6. A locomotive valve gear comprising a transmission bar consisting of a primary and a secondary portion, the latter arranged in superposed relation with respect to the former and consisting of a plurality of elements pivotally connected together, a reciprocatory cross head adapted to be connected with the valve stem of the steam chest valve for operating the latter, a combination lever pivotally connected intermediate its ends to said cross head for actuating the same, a horizontally shiftable shoe arranged above said cross head and having the forward end of said primary portion and the upper end of said lever extending therein, said shoe having its lower portion provided with an arcuate slot, means for pivotally connecting the forward end of said primary portion and the upper end of said lever together, said means extending into said slot and shiftable therein, a vertical arm extending from the top of said shoe, means for pivotally connecting said secondary portion to said arm, and means for actuating said transmission bar and lever.

7. A locomotive valve gear comprising a transmission bar consisting of a primary and a secondary portion, the latter arranged in superposed relation with respect to the former and consisting of a plurality of elements pivotally connected together, a reciprocatory cross head adapted to be connected with the valve stem of the steam chest valve for operating the latter, a combination lever pivotally connected intermediate its ends to said cross head for actuating the same, a horizontally shiftable shoe arranged above said cross head and having the forward end of said primary portion and the upper end of said lever extending therein, said shoe having its lower portion provided with an arcuate slot, means for pivotally connecting the forward end of said primary portion and the upper end of said lever together, said means extending into said slot and shiftable therein, a vertical arm extending from the top of said shoe, means for pivotally connecting said secondary portion to said arm, a slotted link, a block shiftably mounted in said link and having said primary portion at the rear end thereof pivotally connected therewith, a shaft carrying said link, a rocker arm depending from the shaft for rocking the latter, actuating means for said arm, and a link connecting said arm to the lower end of said lever for operating the latter to reciprocate the cross head.

8. In a locomotive valve gear the combination with a pair of reciprocatory cross heads adapted to be connected with the valve stems of the steam chest valves for operating them, of a pair of combination levers, each pivotally connected intermediate its ends to a cross head for actuating it, a horizontally shiftable shoe arranged over each cross head and having its lower portion provided with an arcuate slot, each of said levers extending into the lower portion of a shoe, a pair of transmission bars, each of said bars consisting of a primary and a secondary portion, said primary portion extending into the lower portion of a shoe and said secondary portion extended on the top of the shoe, shiftable means mounted in the upper end of each of the levers for pivotally connecting the primary portion of a transmission bar therewith, said means slidably mounted in the slot of the shoe, means for pivotally connecting the secondary portion of a transmission bar to the top of a shoe, a pair of shafts adapted to extend transversely of a locomotive, one of said shafts arranged within and extending from the other, a journal at the outer terminus of the inner shaft and at the opposite terminus of the outer shaft, a rocker arm depending from one end of the inner shaft and from the opposite end of the outer shaft and providing means for rocking said shafts when said arms are actuated, a slotted link carried by each of the shafts inwardly with respect to the journal thereof, blocks shiftably mounted in said links and having said primary portions pivotally connected therewith, actuating means for said arms, and links connecting said arms to said levers for operating these latter to reciprocate the cross heads.

9. In a locomotive valve gear the combination with a pair of reciprocatory cross heads adapted to be connected with the valve stems of the steam chest valves for operating them, of a pair of combination levers each pivotally connected intermediate its ends to a cross head for actuating it, a horizontally shiftable shoe arranged over each cross head and having its lower portion provided with an arcuate slot, each of said levers extending into the lower portion of a shoe, a pair of transmission bars, each of said bars consisting of a primary and a secondary portion, said primary portion extending into the lower portion of the shoe and said secondary portion extended on the top of the shoe, shiftable means mounted in the upper end of each of the levers for pivotally connecting the primary portion of a transmission bar therewith, said means slidably mounted in the slot of the shoe, means for pivotally connecting the secondary portion of a transmission bar to the top of a shoe, a pair of shafts adapted to extend transversely of a locomotive, one of said shafts arranged within and extending from the other, a journal at one end of the inner shaft and at the opposite end of the outer shaft, a rocker arm depending from one end of the inner shaft and from the opposite end of the outer shaft and providing means when operated to rock said shafts, a slotted link carried by each of the shafts inwardly with respect to the journal thereof, blocks shiftably mounted in said links and having said primary portions pivotally connected therewith, actuating means for said arms, links connecting said arms to said levers for operating these latter to provide for the reciprocation of said cross heads, and supporting means common to said outer shaft and said journals.

10. In a locomotive valve gear a transmission bar formed of a primary and a secondary portion, a valve actuating lever, a horizontally shiftable shoe, means slidably mounted in the upper end of said lever for pivotally connecting the forward end of said primary portion to the upper end of said lever, said shoe slotted at its lower portion, said means extending into and capable of being shifted in the slotted portion of the shoe, means for pivotally connecting the forward end of said secondary portion to said shoe, and cooperative means for operating said transmission bar and said lever.

11. In a locomotive valve gear a transmission bar formed of a primary and a secondary portion, a valve actuating lever, a horizontally shiftable shoe, means slidably mounted in the upper end of said lever for pivotally connecting the forward end of said primary portion to the upper end of said lever, said shoe slotted at its lower portion, said means extending into and capable of being shifted in the slotted portion of the shoe, means for pivotally connecting the forward end of said secondary portion to said shoe, actuating means for said bar and said lever, and a drive element for said actuating means leading from and connected directly to the cross head of the locomotive.

In testimony whereof, I affix my signature hereto.

JOHN W. SHEPARD.